Dec. 4, 1962 P. A. FILIPCZAK 3,066,386
METHOD OF MAKING A SLIP RING ASSEMBLY
Filed May 7, 1958 2 Sheets-Sheet 1

INVENTOR.
Peter A. Filipczak
BY
Harry B. Rook
ATTORNEY

Dec. 4, 1962
P. A. FILIPCZAK
3,066,386
METHOD OF MAKING A SLIP RING ASSEMBLY
Filed May 7, 1958
2 Sheets-Sheet 2
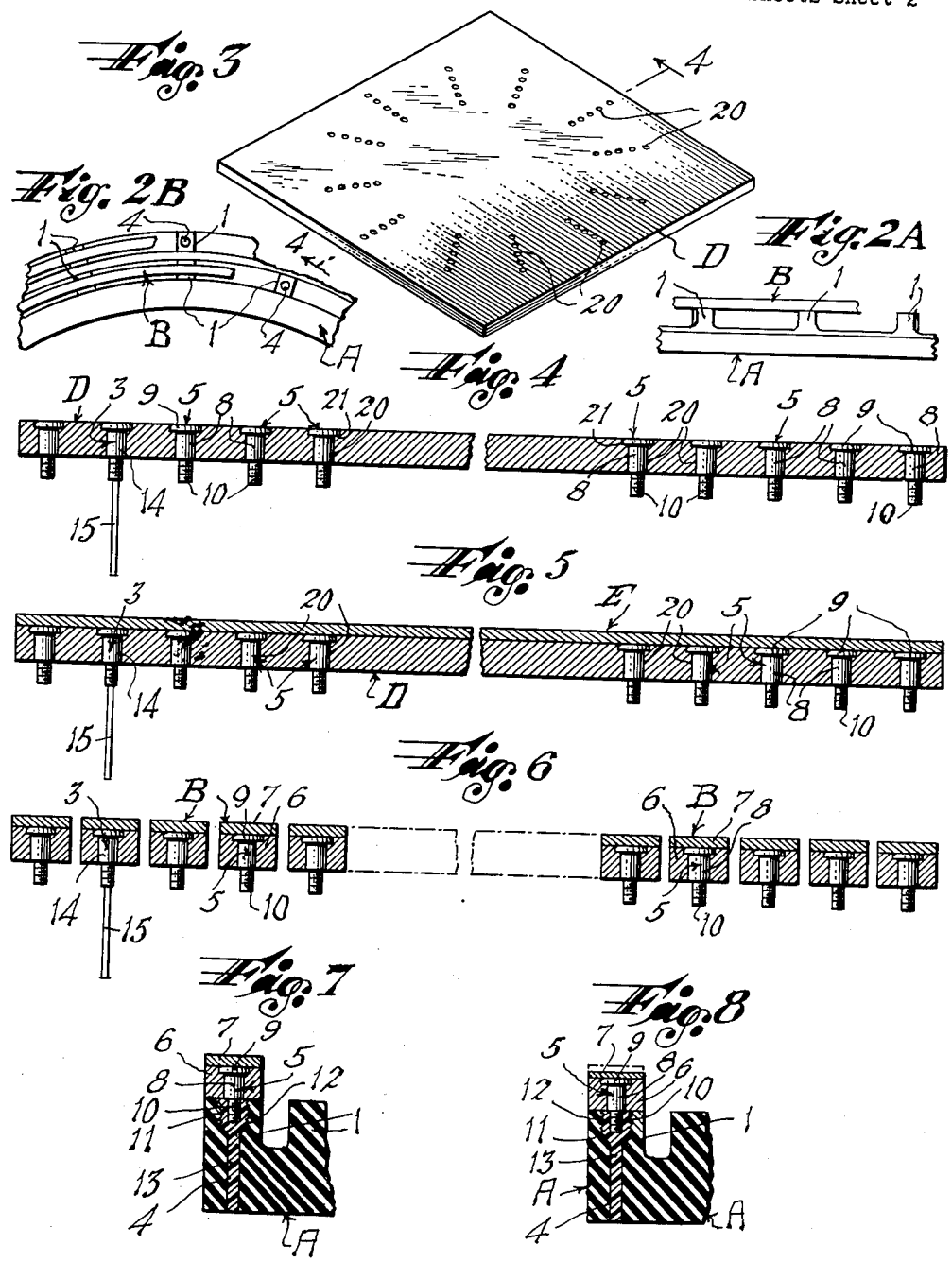
INVENTOR.
Peter A. Filipczak
BY
Harry B. Kook,
ATTORNEY

United States Patent Office 3,066,386
Patented Dec. 4, 1962

3,066,386
METHOD OF MAKING A SLIP RING ASSEMBLY
Peter A. Filipczak, Paramus, N.J., assignor to Electro Tec Corp., South Hackensack, N.J., a corporation of New Jersey
Filed May 7, 1958, Ser. No. 733,620
3 Claims. (Cl. 29—155.5)

This invention relates to the manufacture of slip ring assemblies of the general type that include one or more contact surfaces carried by a suitable support to frictionally contact with another element, for example, a brush.

According to one present practice, coined silver rings are cut from a solid silver sheet and terminal elements are connected to the ring by brazing or soldering. Slip rings so made are not only expensive, but they frequently have soft spots due to the brazing or soldering operations and difficulty is encountered in maintaining smooth contact surfaces.

In the manufacture of another type of slip ring assembly, a base plate or dielectric material has metal contact layers electrodeposited thereon. Such slip ring assemblies are not entirely satisfactory because the dielectric material is in many cases too weak to withstand the strains incident to use and it tends to warp and set up stresses during the electrodepositing of the contact layers thereon. Furthermore, these slip ring assemblies are not capable of carrying high electrical voltages.

A primary object of the present invention is to provide a novel and improved slip ring assembly and a novel and improved method of making it wherein adequate physical strength and electrical current-carrying capacity shall be insured and the difficulties incident to brazing terminal elements to the contact layers shall be eliminated.

Another object of the invention is to provide a novel and improved slip ring assembly which shall include one or more metal base rings formed, for example, of copper or brass, having contact surfaces, such as silver, electrodeposited on one surface thereof, a support plate formed of dielectric material such as a synthetic resin or a ceramic, fastening elements and terminal elements rigidly mounted in the base rings and projecting from the surface thereof opposite the contact layer and cemented in recesses in the support plate so as to rigidly connect the rings to said support plate, the contact layer being electrolytically and physically bonded to said terminal elements.

A further object is to provide a novel and improved method of making such a slip ring assembly comprising sweating, soldering or otherwise rigidly securing the fastening elements and the terminals in openings in a brass or copper base plate with one end of the fastening elements and terminal elements exposed on one surface of the base plate, electrodepositing the contact layer on said surface of the base plate and into direct contact with the exposed portions of the metal terminal elements, cutting or "trepanning" the plate to form rings and cementing the projecting portions of the fastening elements and the terminal elements in recesses in the support plate, and then machining the silver layer to insure smoothness and parallelism of the contact surfaces of the electrodeposited layer.

Other objects, advantages and results will be brought out by the following description in conjunction with the accompanying drawings in which FIGURE 1 is a plan view of a slip ring assembly constructed in accordance with the invention;

FIGURE 2A is a fragmentary side elevation of a portion of the assembly taken from the plane of the line 2A—2A of FIGURE 1;

FIGURE 2B is a fragmentary plan view of one of the circular rows of ring-supporting posts and a portion of a slip ring thereon as shown in FIGURE 2A;

FIGURE 3 is a perspective view of a metal base plate from which the contact rings are to be formed, showing the plate before the electrodeposition of the contact layer;

FIGURE 4 is an enlarged transverse vertical sectional view approximately on the plane of the line 4—4 of FIGURE 3 with portions of the plate broken away;

FIGURE 5 is a similar view showing the electrodeposited layer on the base plate;

FIGURE 6 is a view similar to FIGURE 5 showing the individual rings cut or "trepanned" from the plate;

FIGURE 7 is an enlarged fragmentary vertical sectional view through one of the rings and a portion of the support plate, illustrating the ring securely mounted on the support plate and before finishing or machining of the contact or slip surface layer; and FIGURE 8 is a similar view illustrating the assembly after the contact or slip surface layer has been machined.

Figure 1:
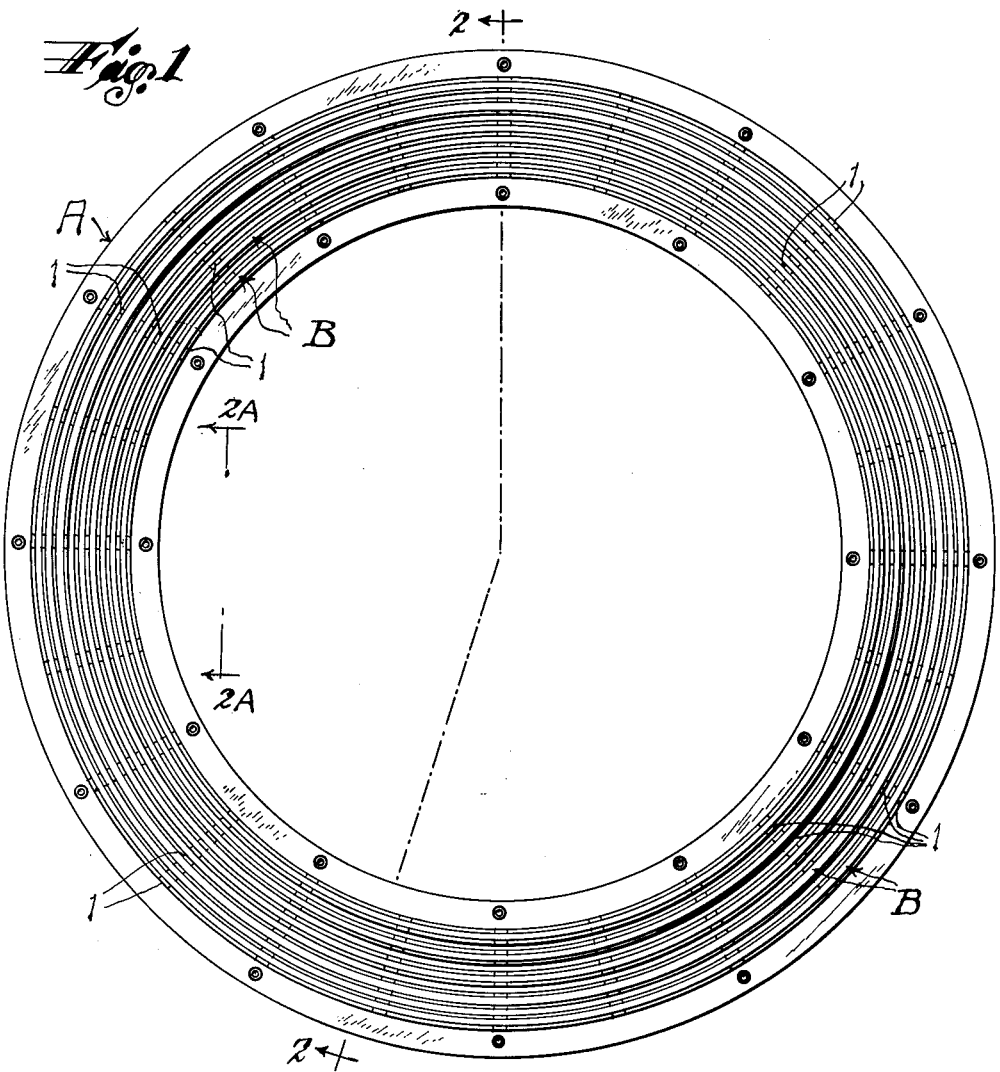
Figure 2:
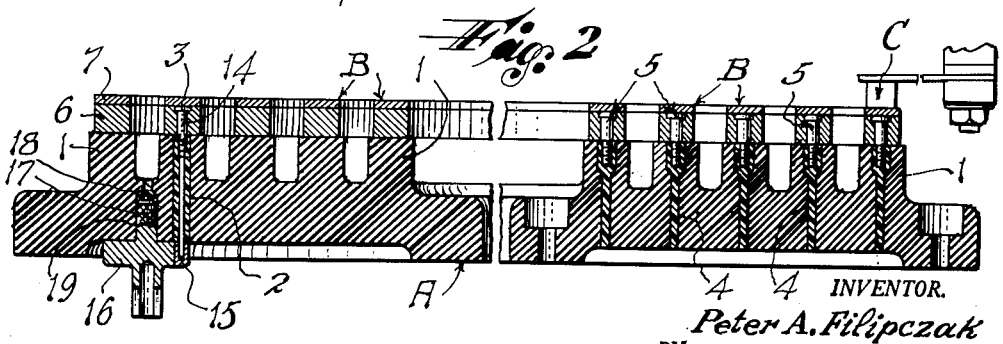
FIGURE 2 is an enlarged fragmentary transverse vertical sectional view approximately on the plane of the line 2—2 of FIGURE 1.

For the purpose of illustrating the principles of the invention, it has been shown in connection with one type of slip ring assembly, but it should be understood that the invention is equally adaptable for use in the manufacture of other types of slip ring assemblies FIGURE 1 shows a slip ring assembly comprising a support plate A formed of suitable dielectric material, for example, a synthetic resinous material, that has a circular row of posts or projections 1 on the top side thereof for each of the slip rings B. Five slip rings are shown but it is understood that there may be only one or any desired number of rings. The support plate also has an opening 2 therethrough, desirably in one post of each row, for a terminal element 3 of the corresponding slip ring, and there is also another opening or recess 4 in each of the other posts or projections on the support plate for each of a plurality of fastening elements 5 for the slip rings. If desired, the terminal element may serve also as a fastening element.

As shown, each slip ring includes a metal base 6 of, for example, brass or copper on the top side of which is an electrodeposited contact or slip surface layer 7 which is electrolytically bonded with the terminal element.

The fastening elements 5 may be of any suitable form but each is shown as a stud having a cylindrical shank 8, provided with a head 9 at one end and a threaded or serrated portion 10 at the other end projecting beyond the base 6. The openings or recesses 4 in the support plate preferably are enlarged at the end thereof opening through the outer face of the corresponding projection 1 as indicated at 11 and the inner surface thereof is preferably tapped or otherwise roughened as indicated at 12. A mass of cementitious material, for example, an epoxy resin 13 is inserted into each opening 4 and has a bonded connection with the roughened portions 10 of the fastening elements and the roughened portions 12 of the walls of the openings 4.

The terminals 3 for the slip ring may also be of suitable construction but each is shown as comprising a rod having a cylindrical shank portion 14 rigidly secured in an opening in the corresponding base ring 6 and having a reduced elongated extension 15 which projects from the side of the base ring 6 opposite the contact layer and through the opening 2 in the support plate. The extension 15 is soldered or otherwise secured in physical and electrical contact with a post 16 which has a knurled portion 17 secured by, for example, epoxy resin 18 in an opening 19 in the support plate A.

It will be understood that in use, the slip ring assembly generally will be associated with a coactive structure which will have a brush or the like C to contact with each slip ring.

In the manufacture of the slip ring assembly in accordance with the invention, there is provided a brass or copper plate D of the desired thickness, for example, .370 inch, of a length and breadth somewhat greater than the diameter of the largest slip ring to be formed. A plurality of circular rows of holes 20 are formed in the plate, one hole for each of the fastening elements 5 and 3, best shown in FIGURE 3, it being understood that the holes may be spaced apart circumferentially of the rings in any distances. The holes preferably are countersunk as indicated at 21 to accommodate the heads 9 of the fastening elements, and each fastening element is press-fitted or sweated, or soldered, or otherwise rigidly secured in one of said holes. The length of the shank portions 8 of the fastening elements will be such that the end portions 10 will project from one side of the plate D as shown in FIGURE 4.

Thereupon, a contact layer E of suitable material, such as silver, or a silver alloy, is electrodeposited all over the side of the plate D at which are exposed the heads of the fastening elements, as shown in FIGURE 5, so that the terminal elements become electrolytically and physically bonded with said layer. The electrodeposited operation may be carried out in any known manner and the thickness of the contact layer may be varied as desired.

Then the plate is cut or "trepanned" by any suitable means so as to provide the individual slip rings as shown in FIGURE 6. Preferably this operation will be performed in such a way that all of the rings will be formed at the same time.

The rings are then secured to their corresponding circular rows of posts or projections 1 on the support plate A, the fastening elements 5 and the terminal elements 3 being cemented in their respective holes 4 and 2 of the support plate. Then the support plate with the rings fastened thereto is placed in a suitable machine and the contact layer E is machined so as to provide proper smoothness and parallelism of the surfaces of the contact layers 7. In FIGURE 7 the contact layer E is shown of the thickness produced during the electrodeposited operation, while in FIGURE 8 the thickness of the contact layer is shown as reduced, the broken lines depicting the thickness of the layer before the machining operation.

With this construction, it will be seen that the metal base rings 6 provide strong supports for the contact layers 7 and the brass plate is resistant to warping and to the setting up of stresses. The metal base rings 6 supplement the current carrying capacity of the contact layers 7 so that those layers may be relatively thin and yet the slip rings will be capable of carrying high voltage current. The connection of the terminals to the brass plate before the electroplating operation and before the rings are formed, eliminates the necessity for brazing or soldering operations, and the method of the invention obviates the necessity for any treatment of the slip ring assembly subsequent to the machining of the contact layers so that smoothness, uniformity of texture and parallelism of the contact surfaces are insured. The metal base rings also provide for rapid conduction of heat away from the zone of contact of the brushes C with the contact layers, and also protect the dielectric support plate against undue heating.

It will be understood that generally slip ring assemblies of this character will be immersed in oil within a casing, and the mounting of the slip rings on the spaced posts or bosses 1 reduces the possibility of localized dielectric stress across small voids between the metal ring and the plastic dielectric. In other words, it is desirable, especially in high voltage slip ring assemblies, that there be a minimum of area of contact between the metal of the ring and the dielectric support, and this is insured by the spaced posts 1.

While the now preferred embodiments of the invention have been illustrated and described, it should be understood that this is primarily for the purposes of explaining the principles of the invention and that many modifications in the construction of the slip ring assembly and in the steps of the method of making it, may be made within the spirit and scope of the invention.

What I claim is:

1. A method of making a slip ring assembly which includes a base ring having an electrodeposited slip layer on its top face and a plurality of shanked elements at least one of which is conductive secured therein and projecting from the bottom face thereof, the steps of forming at least one circular row of holes in a rigid metal plate, rigidly securing one of said elements in each of said holes with one end projecting from the bottom face of the plate and with the other end of at least one said element exposed on the top surface of the plate, electrodepositing a slip layer of electrical conducting material on said top face and on the ends of said elements that are disposed in said top face of such an area as to provide a slip or contact surface for at least one slip ring, and cutting said plate transversely therethrough at opposite sides of said circular row of elements to form at least one slip ring having a base consisting of an annular portion of said plate having its top face coated throughout with a portion of said slip layer and having a plurality of said elements secured thereto in spaced apart relation with the first-mentioned ends of said elements projecting from the bottom face of said base of the ring.

2. In a method as defined in claim 1, forming a plurality of concentric rows of holes and securing said elements therein with at least one conductive element in each row, and cutting said plate transversely therethrough between said circular rows of elements thereby providing a plurality of concentric rings from said plate each bearing a row of said elements.

3. In a method of making a slip ring assembly which includes a metal base ring having an electrodeposited slip surface layer on its top face and a plurality of shanked elements at least one of which is conductive secured therein and projecting from the bottom face thereof and secured in recesses in a support plate, the steps of forming at least one circular row of holes in a rigid metal plate, rigidly securing one of said elements in each of said holes in conductive contact with said plate with one end projecting from the bottom face of the plate and with the other end of at least said one element exposed on the top face of said plate, electrodepositing a slip surface layer of electrical conducting material on said top face of the plate and on said end of said one element that is disposed in said top face of such an area that each of a plurality of portions thereof will provide a slip surface for a slip ring, cutting said plate and said slip layer transversely therethrough at opposite sides of the circular row of elements to form at least one ring having a base consisting of an annular protion of said plate with the top face coated throughout with a portion of said slip layer and carrying said elements with their first-mentioned ends projecting from the bottom face of said base, securing the projecting portion of each of said elements in one of said recesses in the support plate to mount said ring on said support plate, and, while the ring is so mounted, machining said surface layer to provide a smooth and true contact or slip surface.

References Cited in the file of this patent

UNITED STATES PATENTS

| | | |
|---|---|---|
| 2,265,846 | Krantz | Dec. 9, 1941 |
| 2,436,949 | Anderson | Mar. 2, 1948 |
| 2,552,609 | White | May 15, 1951 |
| 2,592,172 | Nippert | Apr. 8, 1952 |
| 2,625,737 | Sponner | Jan. 20, 1953 |
| 2,696,570 | Pandapas | Dec. 7, 1954 |
| 2,711,577 | Leach | June 28, 1955 |
| 2,716,269 | Frisbie et al. | Aug. 30, 1955 |
| 2,934,815 | Stumbock | May 3, 1960 |